United States Patent
Min et al.

(10) Patent No.: US 7,498,752 B2
(45) Date of Patent: Mar. 3, 2009

(54) DRIVING METHOD OF EXTERNAL ELECTRODE FLUORESCENT LAMP INVERTER FOR BACKLIGHT

(75) Inventors: Suok Gyu Min, Suwon (KR); Gun-Woo Moon, Daejeon (KR); Won Sik Oh, Daejeon (KR); Byoung Own Min, Suwon (KR); Jong Sun Kim, Suwon (KR)

(73) Assignee: Samsung Electro-Mechanics., Ltd, Suwon-si (KR)

( * ) Notice: Subject to any disclaimer, the term of this patent is extended or adjusted under 35 U.S.C. 154(b) by 0 days.

(21) Appl. No.: 11/320,794

(22) Filed: Dec. 30, 2005

(65) Prior Publication Data
US 2006/0250095 A1 Nov. 9, 2006

(30) Foreign Application Priority Data
May 9, 2005 (KR) ...................... 10-2005-0038388

(51) Int. Cl.
*G05F 1/00* (2006.01)
(52) U.S. Cl. ......................... 315/291; 315/224; 315/307
(58) Field of Classification Search ............ 315/209 R, 315/307, 308, 224, 225, 244, 276, 291; 363/17, 363/98
See application file for complete search history.

(56) References Cited

U.S. PATENT DOCUMENTS

| | | | | |
|---|---|---|---|---|
| 5,686,798 A * | 11/1997 | Mattas | ........................ | 315/244 |
| 5,691,607 A * | 11/1997 | Zawislak et al. | ............ | 315/308 |
| 5,939,830 A * | 8/1999 | Praiswater | ................ | 315/169.3 |
| 6,064,160 A | 5/2000 | Nakamura | .................... | 315/291 |
| 6,396,722 B2 * | 5/2002 | Lin | ............................. | 363/98 |
| 6,674,250 B2 | 1/2004 | Cho et al. | ................ | 315/209 R |
| 7,148,633 B2 * | 12/2006 | Yu et al. | ...................... | 315/224 |
| 7,218,064 B2 * | 5/2007 | Hung et al. | .................. | 315/291 |
| 2003/0214478 A1 | 11/2003 | Yoo et al. | .................... | 315/308 |

FOREIGN PATENT DOCUMENTS

KR 2003-84326 11/2003

* cited by examiner

*Primary Examiner*—Douglas W Owens
*Assistant Examiner*—Jimmy T Vu
(74) *Attorney, Agent, or Firm*—Stanzione & Kim, LLP (57) ABSTRACT

A driving method of external electrode fluorescent lamp inverter for backlight. In the driving method, a square wave voltage frequency for driving the external electrode fluorescent lamp is applied to the primary side of a transformer in the region whose frequency is substantially ½ of the resonant frequency which is determined by the capacitance of the external electrode fluorescent lamp and the leakage inductance of the transformer. Then, the external electrode fluorescent lamp is caused to emit light by the self-discharge to thereby obtain high efficiency and high luminance. The driving method of external electrode fluorescent lamp inverter for backlight includes applying a square wave voltage for driving an external electrode fluorescent lamp to the primary side of a transformer; and applying the square wave voltage to the primary side of transformer in a region where the frequency thereof is substantially ½ of a resonant frequency, which is determined by the capacitance of the external electrode fluorescent lamp and the leakage inductance of the transformer, and thus causing the external electrode fluorescent lamp to emit light by the self-discharge.

6 Claims, 6 Drawing Sheets

DRIVING METHOD OF EXTERNAL ELECTRODE FLUORESCENT LAMP INVERTER FOR BACKLIGHT

CROSS-REFERENCE TO RELATED APPLICATIONS

This application claims the benefit of Korean Patent Application No. 2005-38388 filed with the Korea Industrial Property Office on May 9, 2005, the disclosure of which is incorporated herein by reference.

BACKGROUND OF THE INVENTION

1. Field of the Invention

The present invention relates to a driving method of external electrode fluorescent lamp inverter for backlight, and more specifically, to a driving method of external electrode fluorescent lamp inverter in which a full-bridge inverter is used to drive an external electrode fluorescent lamp in a self-discharge driving manner, which is different from a cold cathode fluorescent lamp to be driven only by a sine wave, to thereby obtain high efficiency and high luminance.

2. Description of the Related Art

Recently, requests for a display device displaying various information such as video data, graphic data, or text data rapidly increase, in order to deliver a plenty of information in an information-oriented society which rapidly develops. In accordance with the requests, display industries are rapidly growing.

A thin-film-transistor liquid crystal display (TFT-LCD) is a high-tech display element for the next generation, which has lower power consumption than a cathode ray tube (CRT), can be thinned with a light weight, and does not give off harmful electromagnetic waves. The TFT-LCD has made remarkable progress for several years, which is used in various fields as well as in a personal computer. Recently, in the digital broadcasting age, a thin-film-transistor liquid crystal display (TFT-LCD) as well as a plasma display panel (PDP) as a large screen display (more than 30 inch) is getting attention, so worldwide foremost companies put their heart and soul into developing a large screen LCD.

The TFT-LCD is not a self-emission element, different from the PDP or CRT. Therefore, the TFT-LCD is composed of a back light unit (BLU) which is used as a back light source in the rear side of the TFT-LCD, a TFT array which delivers and controls electric signals, liquid crystal which determines transmission of light by changing the molecular structure according to an applied voltage, and a color filter.

Most of existing backlight units (BLU) use a cool cathode fluorescent lamp. The cool cathode fluorescent lamp is a special fluorescent lamp using the cathode which does not generate heat, which is suitable for characteristics of the TFT-LCD. While the cool cathode fluorescent lamp has low power consumption, it exhibits high luminance and is slim and long, so it is mostly used as a light source of LCD.

The cool cathode fluorescent lamp, filled with a certain amount of mercury and a mixed gas of argon (Ar) and neon (Ne), is provided with a glass tube of which the inner surface is coated with a fluorescent substance and internal electrodes which are installed in both ends of the glass tube.

As a method of driving the cool cathode fluorescent lamp, a sine wave driving method is widely used. In order to drive a sine wave, a resonant inverter is used. As a widely-used existing inverter, there is provided a push-pull inverter, a half-bridge inverter, or the like. In the case of the push-pull inverter and half-bridge inverter, a frequency modulation method is used or an inverter is constructed in two stages in order to control a voltage or current which is applied to a lamp.

Recently, another method is also used, which changes a duty ratio (a ratio of on to off of a switching element) by using a full-bridge inverter so as to control a voltage or current which is applied to the cool cathode fluorescent lamp.

While the cool cathode fluorescent lamp has internal electrodes, a recently-developed external electrode fluorescent lamp has electrodes formed outside. The external electrode fluorescent lamp is getting an attention as a light source for a large-screen LCD backlight unit. The external electrode fluorescent lamp having electrodes formed outside the tube has longer life span than the cool cathode fluorescent lamp. Further, since the plurality (about 20) of lamps can be driven in parallel and there is no voltage deviation between the lamps, it is possible to implement uniform luminance.

In the external electrode fluorescent lamp, several external electrode fluorescent lamps are driven by one inverter. Therefore, a full-bridge inverter is frequently used, of which a driving voltage is high and which can control a voltage and current by changing a duty ratio.

As described above, the external electrode fluorescent lamp has similar characteristics to the cool cathode fluorescent lamp and has capacitive load characteristic. Therefore, in the case of using a transformer, the external electrode fluorescent lamp resonates with the leakage inductance of the transformer. Such a characteristic is similar to that of the existing series resonant transformer.

Hereinafter, a method of driving the cool cathode fluorescent lamp inverter according to the related art will be described with reference to the accompanying drawings.

Figure 1:
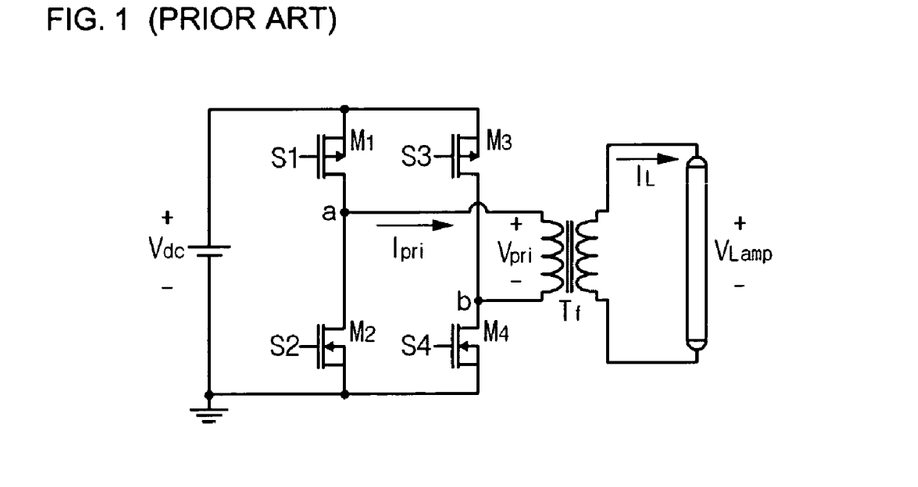
FIG. 1 is a circuit diagram of a general cool cathode fluorescent lamp inverter for backlight.

FIG. 1 is a circuit diagram of a general cool cathode fluorescent lamp inverter for backlight, showing a full-bridge inverter circuit.

As shown in FIG. 1, the full-bridge inverter is composed of first to fourth switching elements M1 to M4 between a DC power supply Vdc and ground. Switching operations of the first to fourth switching elements M1 to M4 allow a voltage to be applied to the primary side of a transformer through a first output terminal A connected between the first and second switching elements M1 and M2 and through a second output terminal B connected between the third and fourth switching elements M3 and M4.

The first switching element M1 composed of an NMOS transistor or a PMOS transistor (the PMOS transistor is shown in FIG. 1) is turned on by a first control signal S1, which is applied to a gate, so as to serve to switch the DC power supply Vdc to the first output terminal A to pull up a voltage level of the first output terminal A. The first switching element is turned on when the signal S1 is 'low'. On the contrary, the second switching element M2 composed of an NMOS transistor is turned on by a second control signal S2, which is applied to a gate, so as to serve to pull down the voltage level of the first output terminal A to a ground voltage level Vss. The second switching element is turned on when the signal S12 is 'high'.

As in the first switching element M1, the third switching element M3 composed of an NMOS transistor or PMOS transistor (the PMOS transistor is shown in FIG. 1) is turned on by a third control signal S3, which is applied to a gate, so as to serve to switch the DC power supply Vdc to the second output terminal B to pull up a voltage level of the second output terminal B. The third switching element is turned on when the signal S3 is 'low'. On the contrary, the fourth switching element M14 composed of an NMOS transistor is turned on by a fourth control signal S4, which is applied to a gate, so as to serve to pull down the voltage level of the second output terminal B to the ground voltage level Vss. The fourth switching element M4 is turned on when the signal S4 is 'high'.

The voltage, applied to both ends of the primary side of the transformer through the first and second output terminals A and B, is the DC power supply voltage Vdc applied from the full-bridge inverter. If the voltage is applied to the primary side of the transformer, a voltage amplified in the secondary side of the transformer drives a cool cathode fluorescent lamp.

Figure 2:
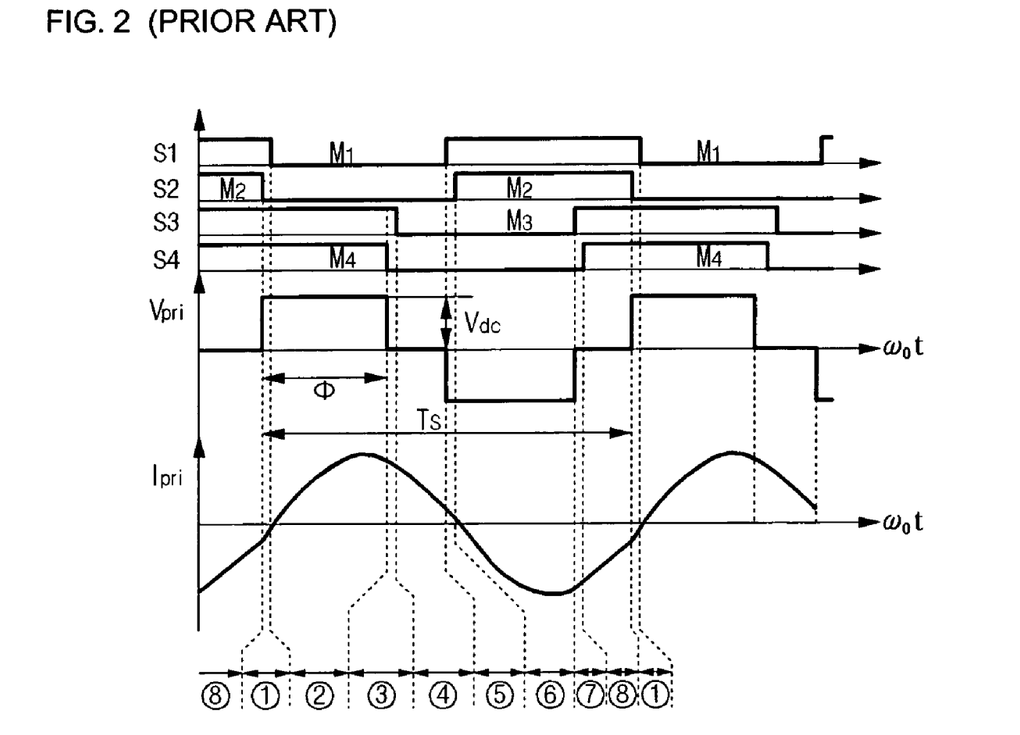
FIG. 2 is a diagram showing main waveforms when a cool cathode fluorescent lamp inverter according to the related art operates.

FIG. 2 is a diagram showing main waveforms when the cool cathode fluorescent lamp inverter according to the related art operates.

As shown in FIG. 2, an operational process of the cool cathode electrode fluorescent lamp inverter will be described as follows, in which one period Ts of waveform is divided into eight intervals ① to ⑧.

First, in the first interval ①, the first switching element M1 which is an PMOS transistor is turned off because the first control signal S1 is 'logic high', the second switching element M2 which is an NMOS transistor is turned off because the second control signal S2 is 'logic low', and the third switching element M3 which is an PMOS transistor is turned off because the third control signal S3 is 'logic high'. On the contrary, the fourth switching element M14 which is an NMOS transistor is turned on because the fourth control signal S14 is 'logic high'.

In the first interval ①, the first to third switching element M1 to M3 are turned off and only the fourth switching element M4 is turned on. Therefore, the power supply voltage Vdc is applied to the primary side of the transformer, because the electric current in the primary side of the transformer flows through the body diode of the switching element M1.

In the second interval ②, the first switching element M1 is turned on because the first control signal S1 changes from 'logic high' to 'logic low', and the second switching element M2 is continuously turned off because the second control signal S2 is continuously 'logic low'. Further, the third switching element M3 is continuously turned off because the third control signal S3 is continuously 'logic high', and the fourth switching element M4 is continuously turned on because the fourth control signal S4 is continuously 'logic high'.

Therefore, in the second interval ②, the power supply voltage Vdc is applied to the primary side of the transformer through the first switching element M1 because the first and fourth switching elements M1 and M4 are turned on. At this time, the electric current Ipri flowing in the primary side of the transformer slowly increases and then decreases, as shown in FIG. 2. That is because the leakage inductance Lr of the transformer resonates with the capacitance Cr of the lamp.

In the third interval ③, the first switching element M1 is continuously turned on because the first control signal S1 is continuously 'logic low', and the second switching element M2 is continuously turned off because the second control signal S2 is continuously 'logic low'. Further, the third switching element M3 is continuously turned off because the third control signal S3 is continuously 'logic high', and the fourth switching element M4 is turned off because the fourth control signal S4 changes from 'logic high' to 'logic low'.

Since the first switching element M1 is turned on and the second to fourth switching elements M2 to M4 are turned off in the third interval ③, a voltage of 0 V is applied to the primary side.

The moment the fourth switching element M4 is turned off, a voltage of 0 V is applied to the primary side of the transformer while the output capacitor of the fourth switching element M4 is charged and the output capacitor of the third switching element M3 is discharged. If the output capacitor of the third switching element M3 is completely discharged, the electric current Ipri flows through the body diode of the second and third switching elements M2 to M3 to thereby set up a zero voltage switching condition.

In the fourth interval ④, the first switching element M1 is continuously turned on because the first control signal S1 is continuously 'logic low', and the second switching element M2 is continuously turned off because the second control signal S2 is continuously 'logic low'. Further, the third switching element M3 is turned on because the third control signal S3 changes from 'logic high' to 'logic low', and the fourth switching element M4 is continuously turned off because the fourth control signal S14 is continuously 'logic low'.

Since the first and third switching element M1 and M3 are turned on and the second and fourth switching elements M2 and M4 are turned off in the fourth interval ④, a voltage to be applied to the primary side of the transformer is 0 V as it is. Therefore, the direction of current flowing in the primary side of the transformer does not change.

In the fifth interval ⑤, the first switching element M1 is turned off because the first control signal S1 changes from 'logic low' to 'logic high', and the second switching element M2 is continuously turned off because the second control signal S2 is continuously 'logic low'. Further, the third switching element M3 is continuously turned on because the third control signal S3 is continuously 'logic low', and the fourth switching element M4 is continuously turned off because the fourth control signal S4 is continuously 'logic low'.

Therefore, in the fifth interval ⑤, the first, second, and fourth switching elements M1, M2, and M4 are turned off, and only the third switching element M3 is turned on. At this time, the direction of current flowing in the primary side of the transformer in the fourth interval ④ has not changed. Therefore, if the first switching element M1 is turned off, the power supply voltage Vdc is supplied to the minus (−) terminal of the primary side of the transformer through the third switching element M3 while the electric current flows through the body diode of the second switching element M2. Therefore, as shown in FIG. 2, the voltage Vpri of the primary side of the transformer whose voltage level has been 0 V descends to the negative (−) potential when the first switching element M1 is turned off. At this time, the electric current flowing in the primary side of the transformer flows in the reverse direction through the body diode of the second switching element M2.

In addition, as the voltage is applied, the voltage polarities of both electrodes of the cool cathode fluorescent lamp change in the fifth interval ⑤.

In the sixth interval ⑥, the first switching element M1 is continuously turned off because the first control signal S1 is continuously 'logic high', and the second switching element M2 is turned on because the second control signal S2 changes from 'logic low' to 'logic high'. Further, the third switching element M3 is continuously turned on because the third control signal S3 is continuously 'logic low', and the fourth switching element M4 is continuously turned off because the fourth control signal S4 is continuously 'logic low'.

In the sixth interval ⑥, the second and third switching element M2 and M3 are turned on, and the first and fourth switching elements M1 and M4 are turned off. Therefore, through the third switching element M3, the power supply voltage Vdc supplied to the minus (−) terminal of the primary side of the transformer flows to the ground potential through the second switching element M2. Accordingly, the voltage Vpri in the primary side of the transformer maintains the negative voltage level, as shown in FIG. 2.

In the seventh interval (7), the first switching element M1 is continuously turned off because the first control signal S1 is continuously 'logic high', and the second switching element M2 is continuously turned on because the second control signal S2 is continuously 'logic high'. The third switching element M3 is turned off because the third control signal S3 changes from 'logic low' to 'logic high', and the fourth switching element M4 is continuously turned off because the fourth control signal S4 is continuously 'logic low'.

In the seventh interval (7), only the second switching element is turned on, and the first, third, and fourth switching elements M1, M3, and M4 are turned off. Therefore, when the third switching element M3 is turned off, the power supply voltage Vdc which has been supplied to the minus (−) terminal of the primary side of the transformer is not supplied any more through the third switching element M3. As a result, the voltage to be applied to the primary side of the transformer is 0 V, as shown in FIG. 2.

Finally, in the eighth interval (8), the first switching element M1 is continuously turned off because the first control signal S1 is continuously 'logic high', and the second switching element M2 is continuously turned on because the second control signal S2 is continuously 'logic high'. Further, the third switching element M3 is continuously turned off because the third control signal S3 is continuously 'logic high', and the fourth switching element M4 is turned on because the fourth control signal S4 changes from 'logic low' to 'logic high'.

Since the second and fourth switching elements M2 and M4 are turned on and the first and third switching elements M1 and M3 are turned off in the eighth interval (8), the voltage Vpri to be applied to the primary side of the transformer is maintained as 0 V, as shown in FIG. 2.

After that, the first to eighth intervals (1) to (8) are continuously repeated.

However, in the above-described method of driving a cool cathode fluorescent lamp inverter for backlight in which the lamp is driven by a sine wave, the lamp cannot be driven by the self discharge, even though a full-bridge inverter is used to control a voltage and current applied to the lamp in the case of the cool cathode fluorescent lamp having the internal electrodes.

In other words, only forming external electrodes causes a wall charge effect, where electric charges are accumulated on the glass wall of both electrodes when a voltage is applied, so that the lamp can emit light, which is referred to as 'the self-discharge driving'. However, since the cool cathode fluorescent lamp has electrodes formed therein, the wall charge effect caused by forming external electrodes does not occur. Therefore, there is a problem that light cannot be emitted with high efficiency and at high luminance by the self discharge.

In addition, in the cool cathode fluorescent lamp, light is emitted only by the sine wave driving method, which makes it hard to drive a square wave voltage. As a result, the switching of the full-bridge inverter switching element cannot be controlled effectively.

SUMMARY OF THE INVENTION

An advantage of the present invention is that it provides a driving method of external electrode fluorescent lamp inverter, in which a square wave voltage frequency for driving an external electrode fluorescent lamp is applied to the primary side of a transformer in the region whose frequency is substantially ½ of a resonant frequency which is determined by the capacitance of the external electrode fluorescent lamp and the leakage inductance of the transformer, so that the external electrode fluorescent lamp is caused to emit light by the self discharge to thereby obtain high efficiency and high luminance.

Additional aspects and advantages of the present general inventive concept will be set forth in part in the description which follows and, in part, will be obvious from the description, or may be learned by practice of the general inventive concept.

According to an aspect of the invention, a driving method of external electrode fluorescent lamp inverter for backlight includes applying a square wave voltage for driving an external electrode fluorescent lamp to the primary side of a transformer; and applying the square wave voltage to the primary side of transformer in a region where the frequency thereof is substantially ½ of a resonant frequency, which is determined by the capacitance of the external electrode fluorescent lamp and the leakage inductance of the transformer, and thus causing the external electrode fluorescent lamp to emit light by the self-discharge.

When the square-wave-voltage frequency divided by the resonant frequency is set to an operation frequency F, the region where the frequency is substantially ½ of the resonant frequency is formed in the frequency range of $0.4 \leq F \leq 0.6$.

According to another aspect of the invention, the external electrode fluorescent lamp is driven by a full-bridge inverter, the full-bridge inverter includes a first switching element serving as a one-side terminal in the primary side of the transformer so as to supply a power supply voltage in accordance with a first control signal; a second switching element serving as a one-side terminal in the primary side of the transformer so as to supply a ground voltage in accordance with a second control signal; a third switching element serving as the other-side terminal in the primary side of the transformer so as to supply a power supply voltage in accordance with a third control signal; and a fourth switching element serving as the other-side terminal in the primary side of the transformer so as to supply a ground voltage in accordance with a fourth control signal.

According to a further aspect of the invention, causing the external electrode fluorescent lamp to emit light by the self-discharge includes turning on the first and fourth switching elements and turning off the second and third switching elements to apply a power supply voltage to the primary side of the transformer; turning on the fourth switching element and turning off the first to third switching elements to apply a voltage of 0 V to the primary side of the transformer so that the self-discharge occurs; turning on the second and third switching elements and turning off the first and fourth switching elements to apply a voltage of 0 V to the primary side of the transformer so that the self-discharge occurs; turning on the second switching element and turning off the first, third, fourth switching elements to apply a voltage of 0 V to the primary side of the transformer so that the self-discharge occurs; turning on the second and third switching elements and turning off the first and fourth switching elements to apply a reverse power supply voltage in the primary side of the transformer; turning on the second switching element and turning off the first, third, and fourth switching elements to apply a voltage of 0 V in the primary side of the transformer so that the self-discharge occurs; turning on the second and fourth switching elements and turning off the first and third switching elements to apply a voltage of 0 V in the primary side of the transformer so that the self-discharge occurs; and turning on the fourth switching element and turning off the first to third switching elements to apply a voltage of 0 V in the primary side of the transformer so that the self-discharge occurs.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

Figure 3:
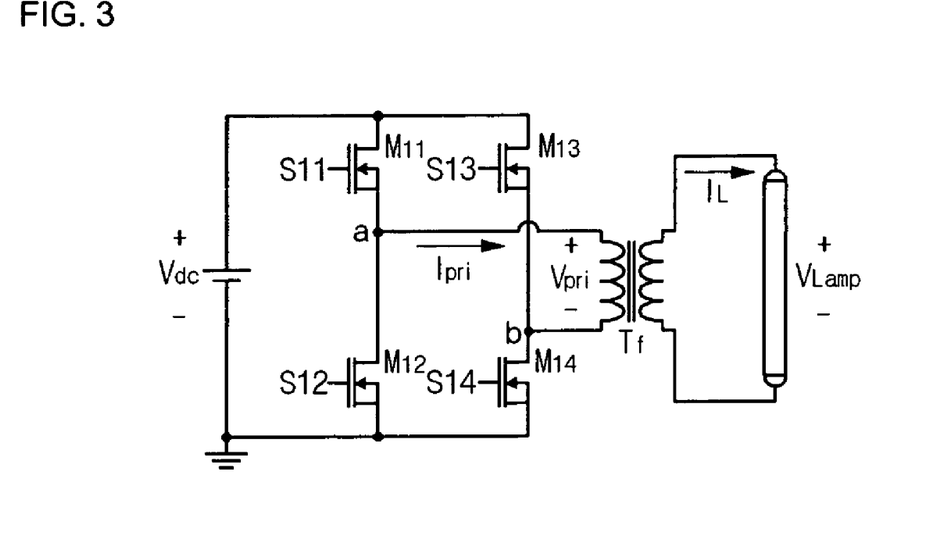
FIG. 3 is a circuit diagram of a general external electrode fluorescent lamp inverter for backlight.

FIG. 3 is a circuit diagram of a general external electrode fluorescent lamp inverter for backlight, showing a full-bridge inverter circuit.

As shown in FIG. 3, the full-bridge inverter is composed of first to fourth switching elements M11 to M14 between a DC power supply Vdc and a ground. Switching operations of the first to fourth switching elements M11 to M14 allow a voltage to be applied to the primary side of a transformer through a first output terminal A connected between the first and second switching elements M11 and M12 and a second output terminal B connected between the third and fourth switching elements M13 and M14.

The first switching element M11 composed of an NMOS transistor (or which may be composed of a PMOS transistor) is turned on by a first control signal S1, which is applied to a gate, so as to serve to switch the DC power supply Vdc to the first output terminal A to pull up a voltage level of the first output terminal A. The first switching element is turned on when the signal S11 is 'high'. On the contrary, the second switching element M12 composed of an NMOS transistor is turned on by a second control signal S12, which is applied to a gate, so as to serve to pull down the voltage level of the first output terminal A into a ground voltage level Vss. The second switching element is turned on when the signal S12 is 'high'.

The third switching element M1 3 composed of an NMOS transistor (or which may be composed of a PMOS transistor) is turned on by a third control signal S13, which is applied to a gate, so as to serve to switch the DC power supply Vdc to the second output terminal B to pull up a voltage level of the second output terminal B. The third switching element is turned on when the signal S13 is 'high'. On the contrary, the fourth switching element M14 composed of an NMOS transistor is turned on by a fourth control signal S14, which is applied to a gate, so as to serve to pull down the voltage level of the second output terminal B to the ground voltage level Vss. The fourth switching element is turned on when the signal S14 is 'high'.

The voltage, applied to both ends of the primary side of the transformer through the first and second output terminals A and B, is the DC power supply Vdc applied from the full-bridge inverter. If the voltage is applied to the primary side of the transformer, a voltage amplified in the secondary side of the transformer drives an external electrode fluorescent lamp.

Figure 4:
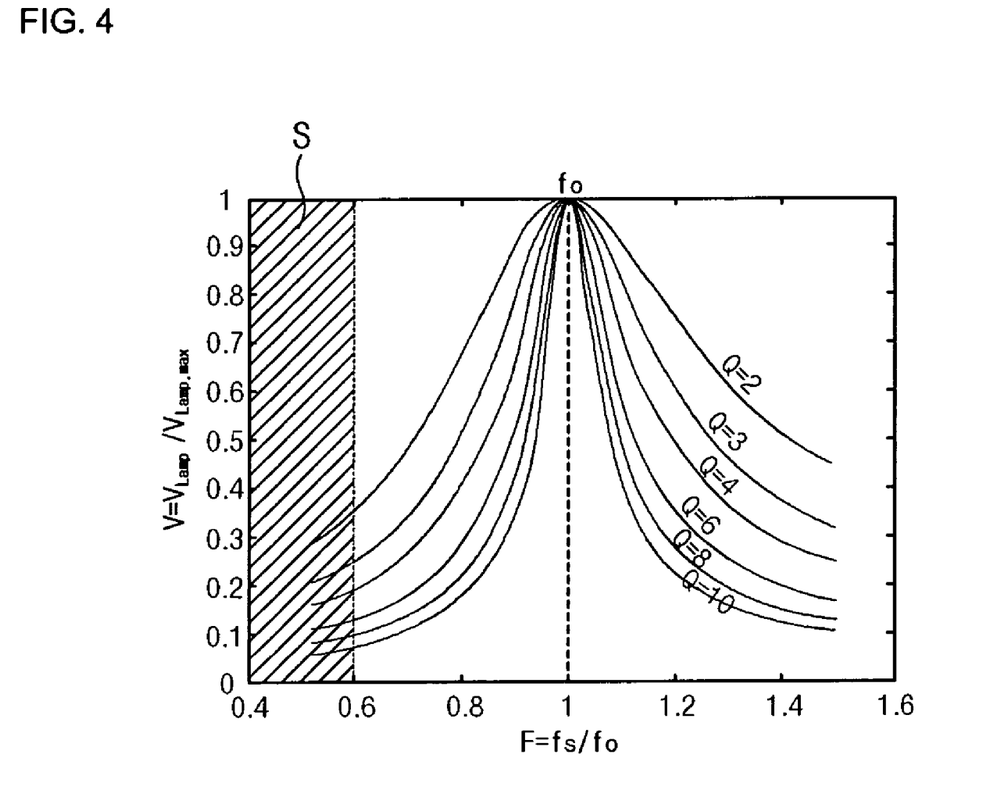
FIG. 4 is a graph for explaining a driving method of external electrode fluorescent lamp inverter according to the present invention, showing characteristic curves of a series resonant output voltage.

FIG. 4 is a graph for explaining a driving method of external electrode fluorescent lamp inverter according to the present invention, showing characteristic curves of a series resonant output voltage.

When a frequency of a square-wave voltage for driving the external electrode fluorescent lamp inverter is set to a driving frequency $f_s$, and when the driving frequency $f_s$ is equal to a resonant frequency $f_o$ as shown in FIG. 4, the characteristic curve of the series resonant output voltage shows that a lamp voltage $V_{Lamp}$ reaches the maximum $V_{Lamp.max}$. At this time, the characteristic curve of the series resonant output voltage shows the change between a driving frequency in relation with a resonant frequency ($f_s/f_o$) around the resonant frequency $f_o$ and a lamp voltage in relation with the maximum lamp voltage ($V_{Lamp}/V_{Lamp.max}$). Here, $f_s/f_o$ is referred to as an operation frequency F.

The resonant frequency $f_o$ is a frequency point where a current or voltage becomes the maximum due to the resonance occurring when a resonant frequency to be determined by the capacitive load of the external electrode fluorescent lamp and the leakage inductance of the transformer is equal to a driving frequency.

As described above, the frequency F shown in FIG. 4 is $f_s/f_o$, and the voltage indicates $V_{Lamp}/V_{Lamp.max}$.

Further, Q representative of a condition on each resonant curve is resonance sharpness (or a quality factor). The resonance sharpness Q is expressed by $Q=f_o/\Delta f$, when a frequency width between two points in which the value at the resonant frequency $f_o$ becomes $1/\sqrt{2}$ through $Z_r/R_{Lamp}=\sqrt{(Lr/Cr)}/R_{Lamp}$ is set to $\Delta f$. That is, the resonance sharpness Q indicates the narrowness of the width between the resonant curves. Here, $Z_r$ indicates a resonant impedance, $R_{Lamp}$ indicates an equivalent resistance of the external fluorescent lamp, Lr indicates a leakage conductance of the transformer, and Cr indicates a capacitance of an external electrode fluorescent lamp.

In addition, a frequency region S shown in FIG. 4 is where a frequency operates at about ½ of the resonant frequency $f_o$. If a square-wave frequency is applied to the primary side of the transformer in the frequency region S, the self-discharge driving is possible, which causes the external electrode fluorescent lamp to emit light more effectively.

As shown in FIG. 4, the frequency region S corresponds to the frequency range F(S) of $0.4 \leq F(S) \leq 0.6$ when the operation frequency F is 1.

If a square-wave frequency is applied to the primary side of the transformer in a frequency region whose frequency is lower than ½ of the resonant frequency $f_o$, that is, in the frequency region where F is less than 0.4, the self-discharge does not effectively occur in the external electrode fluorescent lamp, thereby reducing efficiency and luminance of the lamp. In addition, if a square-wave frequency is applied to the primary side of the transformer in a frequency region whose frequency is higher than ½ of the resonant frequency $f_o$, that is, in the frequency region where F exceeds 0.6, the switching elements generate much heat. Therefore, the frequency region S is preferably formed in the frequency range F(S) of $0.4 \leq F(S) \leq 0.6$ when the operation frequency F is 1.

Figure 5:
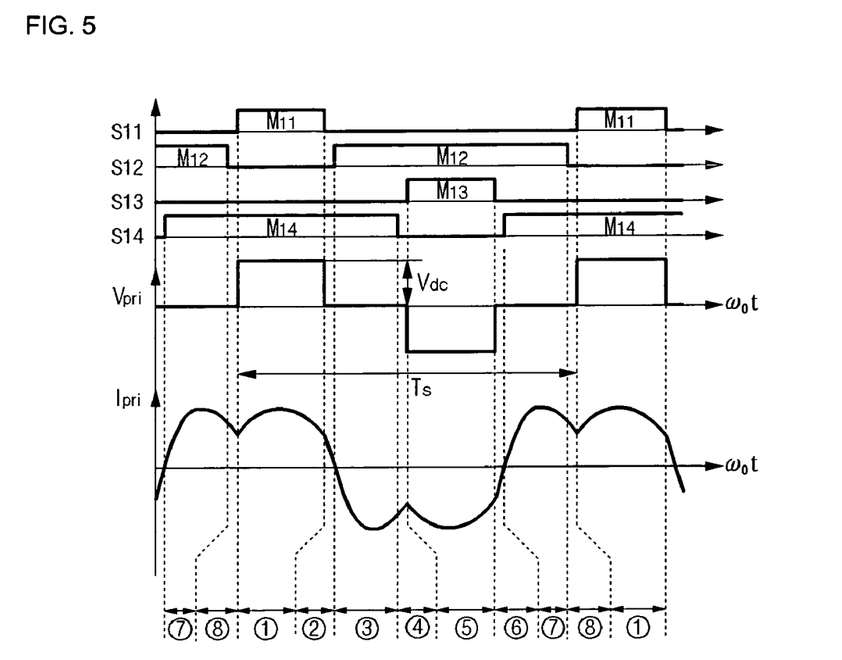
FIG. 5 is a diagram showing main waveforms when the external electrode fluorescent lamp inverter is driven by the self-discharge.

FIG. 5 is a diagram showing main waveforms when the external electrode fluorescent lamp inverter according to the invention is driven by the self-discharge. FIGS. 6a to 6h are composed of operation circuit diagrams in the respective modes when the external electrode fluorescent lamp inverter according to the invention is driven by the self-discharge, and diagrams for explaining the movement of electric charges inside the external electrode fluorescent lamp.

As shown in FIG. 5, an operational process when the external electrode fluorescent lamp inverter is self-discharge driven will be described as follows, in which one period Ts of pulse is divided into eight intervals ① to ⑧.

First, in the first interval ①, the first switching element M11 which is an NMOS transistor is turned on because the first control signal S11 is 'logic high', and the second switching element M12 which is an NMOS transistor is turned off because the second control signal S12 is 'logic low'. Further, the third switching element M13 which is an NMOS transistor is turned off because the third control signal S13 is 'logic low', and the fourth switching element M14 which is an NMOS transistor is turned on because the fourth control signal S14 is 'logic high'.

Figure 6A:
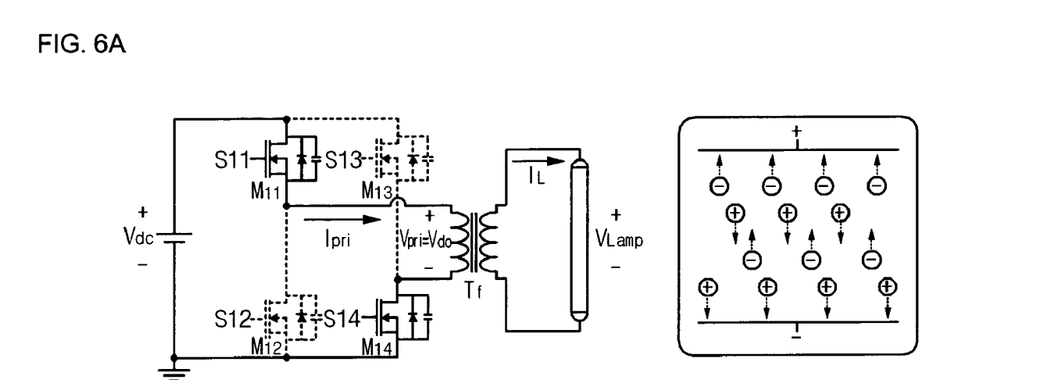
FIGS. 6A to 6H are composed of operation circuit diagrams in the respective modes when the external electrode fluorescent lamp inverter according to the invention is driven by the self-discharge and diagrams for explaining the movement of electric charges inside the external fluorescent lamp.

In the first interval ①, since the first and fourth switching element M11 and M14 are turned on and the second and third switching element M12 and M13 are turned off as shown in FIG. 6A, the power supply voltage Vdc is applied to the primary side of the transformer through the first switching element M11.

If the power supply voltage Vdc is applied to the primary side of the transformer, a voltage amplified in the secondary side thereof drives the external electrode fluorescent lamp.

In an operation of the external electrode fluorescent lamp before the first interval ① begins, a voltage of 0 V is applied to the external electrode fluorescent lamp in the eighth interval ⑧, and the electric current rapidly increases while some of wall charges accumulated in both electrodes are balanced with each other, thereby emitting light. After that, the electric current rapidly decreases while the movement of wall charges is completed (refer to the right of FIG. 6H).

In this state, if the power supply voltage Vdc is applied to the external electrode fluorescent lamp as shown in the right of FIG. 6A, the voltage polarities of both electrodes in the external electrode fluorescent lamp change, so that the wall charges adhered to both electrodes move. Then, a voltage applied from outside is added, and thus an electrical current flows. As a result, the external electrode fluorescent lamp emits light. After that, the electric current rapidly decreases while the charges which have moved to both electrodes form wall charges.

In the second interval ②, the first switching element M11 is turned off because the first control signal S11 changes to 'logic low' from 'logic high', and the second switching element M12 is continuously turned off because the second control signal S12 is continuously 'logic low'. Further, the third switching element M13 is continuously turned off because the third control signal S13 is continuously 'logic low', and the fourth switching element M14 is continuously turned on because the fourth control signal S14 is continuously 'logic high'.

Figure 6B:
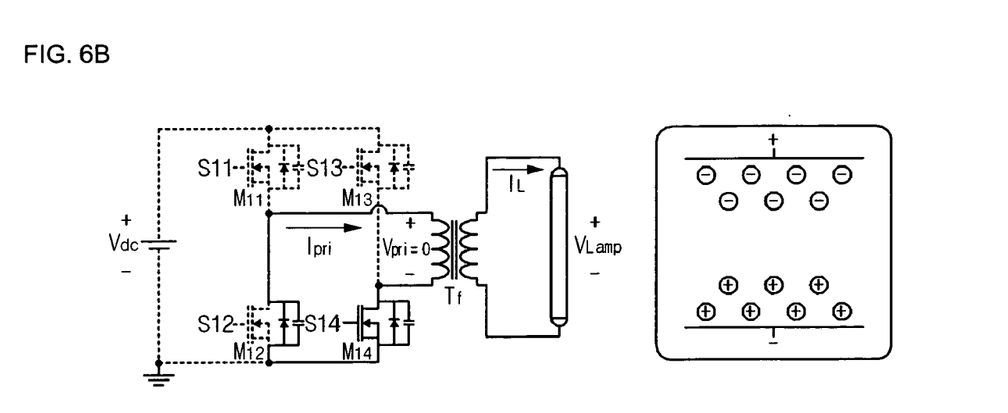

Since the first to third switching elements M11 to M13 are turned off and only the fourth switching element M14 is turned on in the second interval ② as shown in FIG. 6B, a voltage to be applied to the primary side of the transformer is 0 V.

The moment the first switching element M11 is turned off, a voltage of 0 V is applied to the primary side of the transformer while the output capacitor of the first switching element M11 is charged and the output capacitor of the second switching element M12 is discharged. If the output capacitor of the second switching element M12 is completely discharged, the electric current flows through the body diode of the second switching element M12 to thereby set up a zero voltage switching condition.

As shown in the right of FIG. 6B, the wall charges formed in the first interval ① are continuously accumulated in both electrodes of the external electrode fluorescent lamp. Therefore, the electric current approximate to 0 (zero) flows in the external electrode fluorescent lamp at the point of time when the second interval ② ends.

In the third interval ③, the first switching element M11 is continuously turned off because the first control signal S11 is continuously 'logic low', and the second switching element M12 is turned on because the second control signal S12 changes from 'logic low' to 'logic high'. Further, the third switching element M13 is continuously turned off because the third control signal S13 is continuously 'logic low', and the fourth switching element M14 is continuously turned on because the fourth control signal S14 is continuously 'logic high'.

Figure 6C:
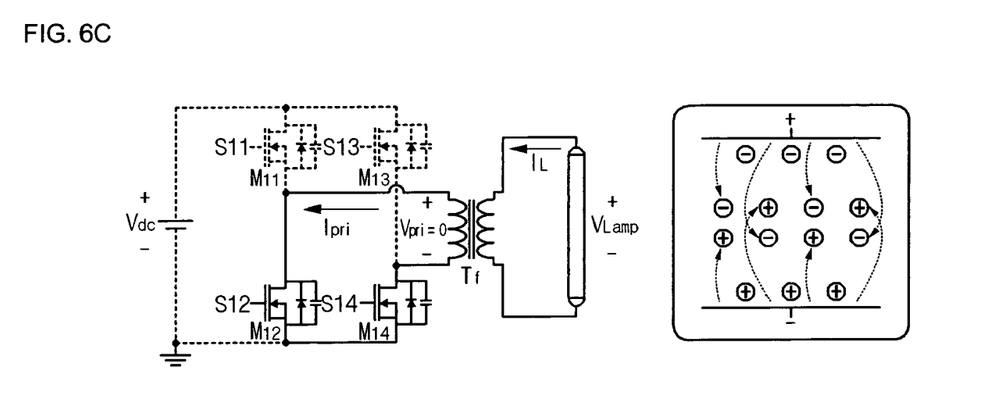

Since the first and third switching elements M11 and M13 are turned on and the second and fourth switching elements M12 and M14 are turned off in the third interval ③ as shown in FIG. 6C, a voltage of 0 V is applied to the primary side of the transformer.

At this time, as shown in FIG. 5, the electric current flowing in the primary side of the transformer rapidly increases in the reverse direction after the second switching element M12 is turned on, and then decreases.

The reason is as follows. As shown in the right of FIG. 6C, if a voltage of 0 V is applied to the external electrode fluorescent lamp after the wall charges are accumulated in both electrodes of the lamp in the second interval ②, an electric current flows while some of the wall charges move to be balanced with each other, thereby causing light to be emitted once more. The electric current flowing in the primary side of the transformer rapidly increases in the reverse direction and then rapidly decreases while the movement of wall charges is completed.

As such, in the state where the voltage Vpri of 0 V is applied to the primary side of the transformer, the electric current Ipri flowing in the primary side of the transformer is caused to increase in the reverse direction so that the external electrode fluorescent lamp emits light. Therefore, the switching loss is nearly 0 (zero).

In the fourth interval ④, the first switching element M11 is continuously turned off because the first control signal S11 is continuously 'logic low', the second switching element M12 is continuously turned on because the second control signal S12 is continuously 'logic high', and the third switching element M13 is continuously turned off because the third control signal S13 is continuously 'logic low'. Further, the fourth switching element M14 is turned off because the fourth control signal S14 changes from 'logic high' to 'logic low'.

Figure 6D:
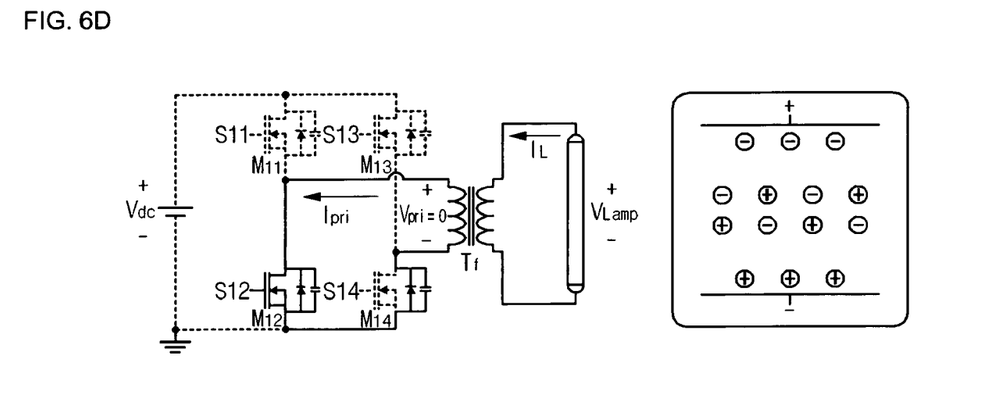

In the fourth interval ④ as shown in FIG. 6D, only the second switching element M12 is turned on, and the first, third, and fourth switching elements M11, M13, and M14 are turned off. Therefore, a voltage to be applied to the primary side of the transformer is 0 V as it is. At this time, although the fourth switching element M14 is turned off, the electric current continuously flows through the body diode of the fourth switching element M14.

Here, the electric current flowing in the primary side of the transformer decreases, as shown in FIG. 5. The reason is as follows. If a voltage of 0 V is applied to the external electrode fluorescent lamp after the wall charges are accumulated in both electrodes of the lamp in the second interval ②, an electric current rapidly increases in the reverse direction while some of the wall charges accumulated in the electrodes are balanced with each other in the third interval ③. Then, the movement of the wall charges is completed. Further, such a state continues in the fourth interval ④, as shown in the right side of FIG. 6D.

In the fifth interval ⑤, the first switching element M11 is turned off because the first control signal S11 is continuously 'logic low', and the second switching element M12 is turned on because the second control signal S12 is continuously 'logic high'. Further, the third switching element M13 is turned on because the third control signal S13 changes from 'logic low' to 'logic high', and the fourth switching element M14 is continuously turned off because the fourth control signal S14 is continuously 'logic low'.

Figure 6E:
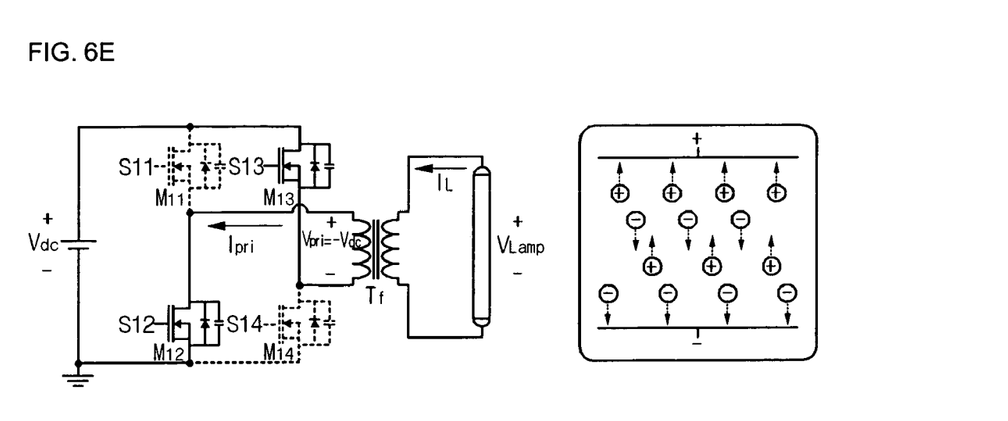

In the fifth interval ⑤ as shown in FIG. 6E, the second and third switching elements M12 and M13 are turned on, and the first and fourth switching elements M11 and M14 are turned off. Therefore, a voltage to be applied to the primary side of the transformer flows into the second switching element M12 through the third switching element M13, so that the polarity of the voltage changes as shown in FIG. 5.

The moment the third switching element M13 is turned on, the electric current Ipri flowing in the primary side of the transformer rapidly increases, and then decreases, as shown in FIG. 5. At this time, while the voltage polarities of both electrodes in the external electrode fluorescent lamp change, the wall charges adhered to both electrodes move, as shown in FIG. 6E. Then, a voltage applied from outside is added, and thus an electrical current flows. As a result, the external electrode fluorescent lamp emits light. After that, the charges which have moved to both electrodes form wall charges.

In the sixth interval ⑥, the first switching element M11 is continuously turned off because the first control signal S11 is continuously 'logic low', and the second switching element M12 is continuously turned on because the second control signal S12 is continuously 'logic high'. Further, the third switching element M13 is turned off because the third control signal S13 changes from 'logic high' to 'logic low', and the fourth switching element M14 is continuously turned off because the fourth control signal S14 is continuously 'logic low'.

Figure 6F:
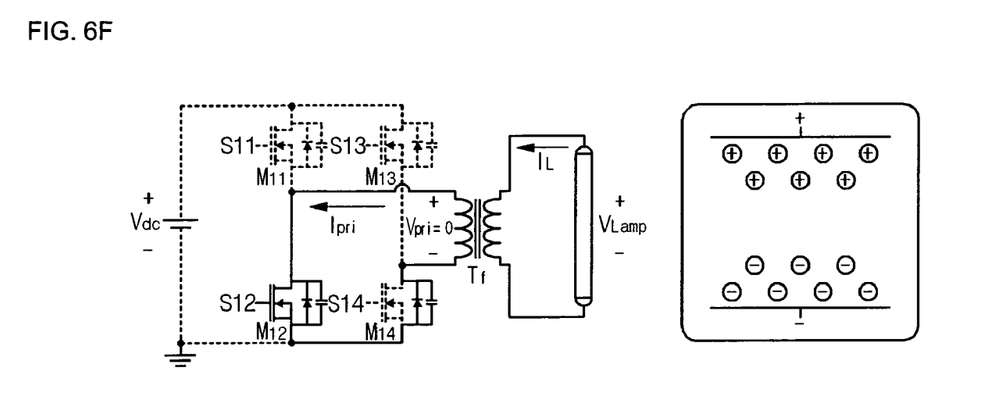

In the sixth interval ⑥ as shown in FIG. 6F, the moment the third switching element M13 is turned off, a voltage of 0 V is applied to the primary side of the transformer while the output capacitor of the third switching element M13 is charged and the output capacitor of the fourth switching element M14 is discharged. If the output capacitor of the fourth switching element M14 is completely discharged, the electric current flows through the body diode of the fourth switching element M14 to thereby set up a zero voltage switching condition.

As shown in the right of FIG. 6F, the wall charges formed in the fifth interval ⑤ are continuously accumulated in both electrodes of the external electrode fluorescent lamp. Therefore, the electric current approximate to 0 (zero) flows in the external electrode fluorescent lamp at the point of time when the sixth interval ⑥ ends.

In the seventh interval ⑦, the first switching element M11 is continuously turned off because the first control signal S11 is continuously 'logic low', the second switching element M12 is continuously turned on because the second control signal S12 is continuously 'logic high', and the third switching element M13 is continuously turned off because the third control signal S13 is continuously 'logic low'. Further, the fourth switching element M14 is turned on because the fourth control signal S14 changes from 'logic low' to 'logic high'.

Figure 6G:
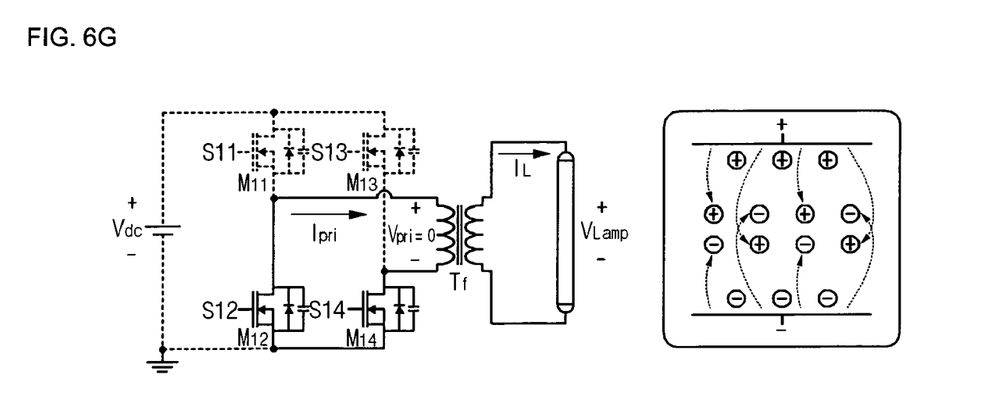

In the seventh interval ⑦ as shown in FIG. 6G, the second and fourth switching elements M12 and M14 are turned on, and the first and third elements M11 and M13 are turned off. Therefore, the voltage Vpri to be applied to the primary side of the transformer is 0 V.

At this time, as shown in FIG. 5, the electric current flowing in the primary side of the transformer rapidly increases in the reverse direction after the fourth switching element M14 is turned on, and it then decreases.

The reason is as follows. As shown in the right of FIG. 6G, if a voltage of 0 V is applied to the external electrode fluorescent lamp after the wall charges are accumulated in both electrodes of the lamp in the sixth interval ⑥, an electric current flows while some of the wall charges accumulated in the electrodes move to be balanced with each other, thereby causing light to be emitted once more. The electric current flowing in the primary side of the transformer rapidly increases in the reverse direction and then rapidly decreases while the movement of wall charges is completed.

In the seventh interval ⑦, in a state where the voltage Vpri of 0 V is applied to the primary side of the transformer, the electric current Ipri flowing in the primary side of the transformer is caused to rapidly increase in the reverse direction so that the external electrode fluorescent lamp emits light. Therefore, the switching loss is nearly 0 (zero).

In the eighth interval ⑧, the first switching element M11 is continuously turned off because the first control signal S11 is continuously 'logic low', and the second switching element M12 is turned off because the second control signal S12 changes from 'logic high' to 'logic low'. Further, the third switching element M13 is continuously turned off because the third control signal S13 is continuously 'logic low', and the fourth switching element M14 is continuously turned on because the fourth control signal S14 is 'logic high'.

Figure 6H:
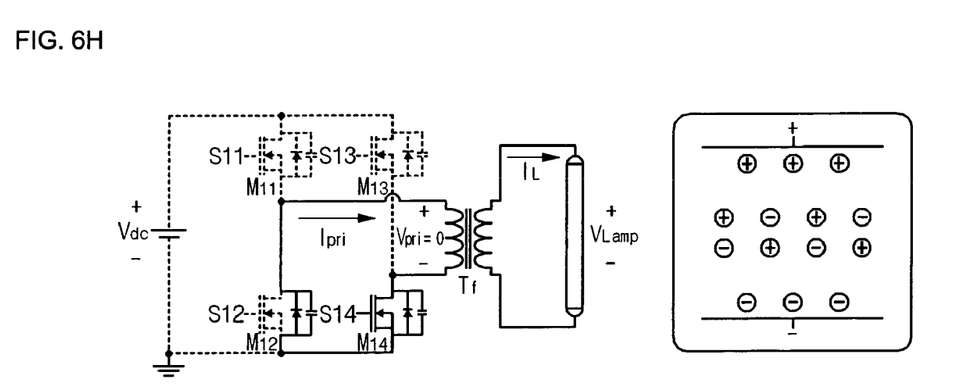

In the eighth interval ⑧ as shown in FIG. 6H, only the fourth switching element M14 is turned on, and the first to third switching element M11 to M13 are all turned off. Therefore, the voltage to be applied to the primary side of the transformer is maintained as 0 V. At this time, although the second switching elements M12 is turned off, the electric current continuously flows through the body diode of the second switching element M12.

Here, the electric current flowing in the primary side of the transformer decreases, as shown in FIG. 5. The reason is as follows. If a voltage of 0 V is applied to the external electrode fluorescent lamp after the wall charges are accumulated in both electrodes of the lamp in the sixth interval ⑥, an electric current rapidly increases in the reverse direction while some of the wall charges accumulated in the electrodes are balanced with each other in the seventh interval ⑦. Then, the movement of the wall charges is completed. Further, such a state continues in the eighth interval ⑧, as shown in the right side of FIG. 6H.

After that, the first to eighth intervals ① to ⑧ are continuously repeated.

While the present invention has been described with reference to exemplary embodiments thereof, it will be understood by those skilled in the art that various changes and modifications in form and details may be made therein without departing from the scope of the present invention as defined by the following claims.

According to the driving method of external electrode fluorescent lamp inverter of the present invention as described above, the external electrode fluorescent lamp is driven by self-discharge to thereby have more improved efficiency and luminance than a cool cathode fluorescent lamp.

Contrary to the cool cathode fluorescent lamp which emits light by using only a sine wave driving method, the self-discharge is possible in the external electrode fluorescent lamp. Accordingly, since a square wave voltage can be applied, the switching of the full-bridge inverter switching element can be effectively controlled.

Furthermore, the full-bridge inverter is used, and a square wave voltage frequency for driving the external electrode fluorescent lamp is applied to the primary side of the transformer in the region whose frequency is substantially ½ of the resonant frequency which is determined by the capacitance of the external electrode fluorescent lamp and the leakage inductance of the transformer. Then, the external electrode fluorescent lamp is caused to emit light by the self-discharge to thereby obtain high efficiency and high luminance.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A driving method of external electrode fluorescent lamp inverter for backlight comprising:
   applying a square-wave-voltage to drive an external electrode fluorescent lamp to a primary side of a transformer; and
   controlling a plurality of switching elements to turn on and off to correspond to the square-wave-voltage, such that a resulting current of the primary side of the transformer to control light emitted from the external electrode fluorescent lamp is formed based on a timing of the plurality of switching elements and the square-wave-voltage, wherein:
   a frequency of the square-wave-voltage is in a frequency region S where a frequency of the frequency region S is substantially ½ of a resonant frequency, which is determined by a capacitance of the external electrode fluorescent lamp and a leakage inductance of the transformer, and thus causing the external electrode fluorescent lamp to emit the light by a self-discharge, and
   an operation frequency F is a ratio value obtained by dividing the square-wave-voltage frequency by the resonant frequency, such that the frequency region S is formed in a frequency range of $0.4 \leq F(S) \leq 0.6$.

2. The driving method of external electrode fluorescent lamp inverter for backlight according to claim 1, wherein the external electrode fluorescent lamp is driven by a full-bridge inverter, the full-bridge inverter including:
   a first switching element serving as a one-side terminal in the primary side of the transformer so as to supply a power supply voltage in accordance with a first control signal;
   a second switching element serving as a one-side terminal in the primary side of the transformer so as to supply a ground voltage in accordance with a second control signal;
   a third switching element serving as the other-side terminal in the primary side of the transformer so as to supply a power supply voltage in accordance with a third control signal; and
   a fourth switching element serving as the other-side terminal in the primary side of the transformer so as to supply a ground voltage in accordance with a fourth control signal.

3. The driving method of external electrode fluorescent lamp inverter for backlight according to claim 2, wherein causing the external electrode fluorescent lamp to emit light by the self-discharge includes:
   turning on the first and fourth switching elements and turning off the second and third switching elements to apply a power supply voltage to the primary side of the transformer;
   turning on the fourth switching element and turning off the first to third switching elements to apply a voltage of 0 V to the primary side of the transformer so that the self-discharge occurs;
   turning on the second and third switching elements and turning off the first and fourth switching elements to apply a voltage of 0 V to the primary side of the transformer so that the self-discharge occurs;
   turning on the second switching element and turning off the first, third, fourth switching elements to apply a voltage of 0 V to the primary side of the transformer so that the self-discharge occurs;
   turning on the second and third switching elements and turning off the first and fourth switching elements to apply a reverse power supply voltage in the primary side of the transformer;
   turning on the second switching element and turning off the first, third, and fourth switching elements to apply a voltage of 0 V in the primary side of the transformer so that the self-discharge occurs;
   turning on the second and fourth switching elements arid turning off the first and third switching elements to apply a voltage of 0 V in the primary side of the transformer so that the self-discharge occurs; and
   turning on the fourth switching element and turning off the first to third switching elements to apply a voltage of 0 V in the primary side of the transformer so that the self-discharge occurs.

4. A driving method of external electrode fluorescent lamp inverter for backlight comprising:
   applying a square wave voltage to drive an external electrode fluorescent lamp to a primary side of a transformer; and
   applying the square wave voltage to the primary side of the transformer such that a frequency of the square wave voltage is in a frequency region where a frequency of the frequency region is substantially ½ of a resonant frequency, which is determined by a capacitance of the external electrode fluorescent lamp and a leakage inductance of the transformer, and thus causing the external electrode fluorescent lamp to emit light by a self-discharge, wherein:
   the external electrode fluorescent lamp is driven by full-bridge inverter, the full-bridge inverter including:

a first switching element serving as a one-side terminal in the primary side of the transformer so as to supply a power supply voltage in a accordance with first control signal, a second switching element serving as a one-side terminal in the primary side of the transformer so as to supply a ground voltage in accordance with a second control signal, a third switching element serving as the other-side terminal in the primary side of the transformer so as to supply a power supply voltage in accordance with third control signal; and a fourth switching element serving as the other-side terminal in the primary side of the transformer so as to supply a ground voltage in accordance with a fourth control signal; and a current to control the light emitted from the external electrode fluorescent lamp is formed based on a timing of the first switching element, the second switching element, the third switching element, the fourth switching element, and the square wave voltage.

5. A driving method of external electrode fluorescent lamp inverter for backlight comprising:

applying a square-wave-voltage for driving an external electrode fluorescent lamp to the primary side of a transformer; and applying the square-wave-voltage to the primary side of the transformer such that a frequency of the square-wave-voltage is in a frequency region where a frequency of the frequency region is substantially ½ of a resonant frequency, which is determined by a capacitance of the external electrode fluorescent lamp and a leakage inductance of the transformer, and thus causing the external electrode fluorescent lamp to emit light by a self-discharge, wherein:

the external electrode fluorescent lamp is driven by a full-bridge inverter, the full bridge inverter comprising:
  a first switching element,
  a second switching element,
  a third switching element, and
  a fourth switching element; and a current to control the light emitted from the external electrode fluorescent lamp is formed based on a timing of the first switching element, the second switching element, the third switching element, the fourth switching element, and the square wave voltage.

6. The driving method of external electrode fluorescent lamp inverter for backlight according to claim 5, wherein causing the external electrode fluorescent lamp to emit light by the self-discharge includes:

turning on the first and fourth switching elements and turning off the second and third switching elements to apply a power supply voltage to the primary side of the transformer;

turning on the fourth switching element and turning off the first to third switching elements to apply a voltage of 0 V to the primary side of the transformer so that the self-discharge occurs;

turning on the second and third switching elements and turning off the first and fourth switching elements to apply a voltage of 0 V to the primary side of the transformer so that the self-discharge occurs;

turning on the second switching element and turning off the first, third, fourth switching elements to apply a voltage of 0 V to the primary side of the transformer so that the self-discharge occurs;

turning on the second and third switching elements and turning off the first and fourth switching elements to apply a reverse power supply voltage in the primary side of the transformer;

turning on the second switching element and turning off the first, third, and fourth switching elements to apply a voltage of 0 V in the primary side of the transformer so that the self-discharge occurs;

turning on the second and fourth switching elements and turning off the first and third switching elements to apply a voltage of 0 V in the primary side of the transformer so that the self-discharge occurs; and turning on the fourth switching element and turning off the first to third switching elements to apply a voltage of 0 V in the primary side of the transformer so that the self-discharge occurs.

* * * * *